United States Patent [19]

Hayashi

[11] Patent Number: 5,878,009

[45] Date of Patent: Mar. 2, 1999

[54] DISK DRIVE INCLUDING RECORDING MEDIUM HAVING DISK OPERATION INFORMATION RECORDED THEREON

[75] Inventor: Mitsuhiro Hayashi, Kitakatsuragi-gun, Japan

[73] Assignee: Sharp Kabushiki Kaisha, Osaka, Japan

[21] Appl. No.: 574,867

[22] Filed: Dec. 19, 1995

[30] Foreign Application Priority Data

Dec. 20, 1994 [JP] Japan .................................. 6-316416

[51] Int. Cl.$^6$ ................................................. G11B 20/10
[52] U.S. Cl. ................................ 369/48; 369/59; 360/51
[58] Field of Search ............................ 369/59, 124, 47, 369/48; 360/51, 44, 52, 53, 27; 386/16, 88, 90, 13, 85

[56] References Cited

U.S. PATENT DOCUMENTS

| | | | |
|---|---|---|---|
| 3,755,798 | 8/1973 | Aguirre | 360/51 |
| 3,887,942 | 6/1975 | Horowitz | 360/51 |
| 4,027,267 | 5/1977 | Larsen | 329/106 |
| 4,417,286 | 11/1983 | Anderson | 360/51 |
| 4,459,623 | 7/1984 | Glenn | 360/51 X |
| 4,714,968 | 12/1987 | Troletti | 360/51 |
| 4,851,932 | 7/1989 | Scheer et al. | 360/51 |
| 5,220,556 | 6/1993 | Shimizu | 369/275 |
| 5,345,434 | 9/1994 | Ide | 369/59 X |

FOREIGN PATENT DOCUMENTS 27 18 490  12/1977  Germany .

2-189771  7/1990  Japan .
5109076   4/1993  Japan .

OTHER PUBLICATIONS

English Translation of Abstract of Japanese Patent No. 2–189,771 published Jul. 25, 1990.

Translation of a German Office Action dated Dec. 2, 1996.

*Primary Examiner*—Alan Faber
*Attorney, Agent, or Firm*—Dike, Bronstein, Roberts & Cushman LLP; David G. Conlin; William J. Daley, Jr.

[57] ABSTRACT

The disk drive, which is used for performing at least a reproducing operation for a disk-shaped recording medium having a PEP region where information relating to the at least a reproducing operation is recorded, includes: a rotator for rotating the recording medium; a pickup for reading a signal from the recording medium; processing circuits for thresholding a length of a period in which the level of the signal remains unchanged; a demodulating circuit for receiving the thresholding result and for demodulating the signal to reproduce the information based on the thresholding result; a detector for detecting the rotation speed of the recording medium and for outputting a rotation speed signal indicative of it; correcting circuits for receiving the rotation speed signal, and for supplying a discrimination value in accordance with the rotation speed of the recording medium. The discrimination value is used for thresholding the length of the period. In the disk drive of the present invention, the signals are demodulated based on the thresholding result obtained using the discrimination value, whereby allowing the information to be reproduced correctly while the rotation speed of the recording medium changes.

7 Claims, 7 Drawing Sheets

P: Mark-present portion
A: Mark-absent portion

S = Short
L = Long

DISK DRIVE INCLUDING RECORDING MEDIUM HAVING DISK OPERATION INFORMATION RECORDED THEREON

BACKGROUND OF THE INVENTION

1. Field of the Invention

The present invention relates to a disk drive for reproducing information from a disk-shaped recording medium, such as a magnetooptical disk, an optical disk and the like, and/or recording information thereon. More specifically, the present invention relates to a signal processing section for processing a signal read from the recording medium.

2. Description of the Related Art

On a recording surface of a disk-shaped recording medium (hereinafter, simply referred to as a disk), for example, a magnetooptical disk having a diameter of 130 mm (hereinafter, simply referred to as a 130 mm magnetooptical disk), a region is provided for storing various kinds of information, including: servo methods; a rotation mode; the type of disk, i.e., whether the disk is of a read-only type, a write-once type, or a rewritable type; a modulation method; an error correction code; a number of user bytes in one sector, and the like. This region is called a "PEP region".

Figure 5:
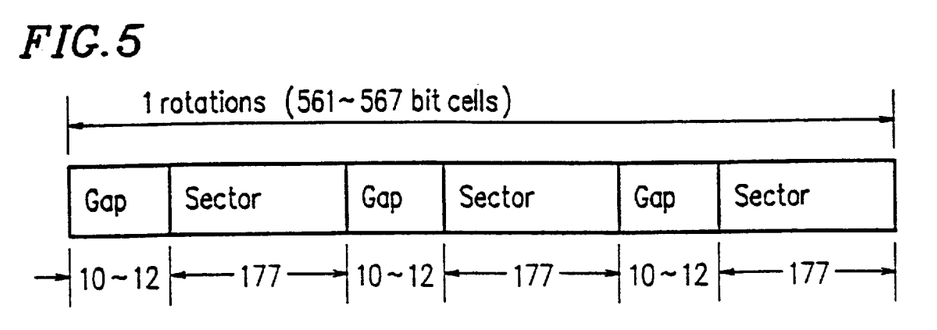
FIG. 5 is a map showing the data format of the PEP region which corresponds to one rotation of the disk.

The data format of the PEP region is determined in accordance with the standard. As shown in FIG. 5, three gap parts where no signal is recorded and three sector parts where various kinds of information are recorded are alternately arranged per one rotation of the disk. The PEP region is composed of 561 to 567 bit cells per one rotation of the disk. A "bit cell" herein refers to a unit length of the region in which one unit of information representing either "0" or "1" is recorded.

Figure 6:
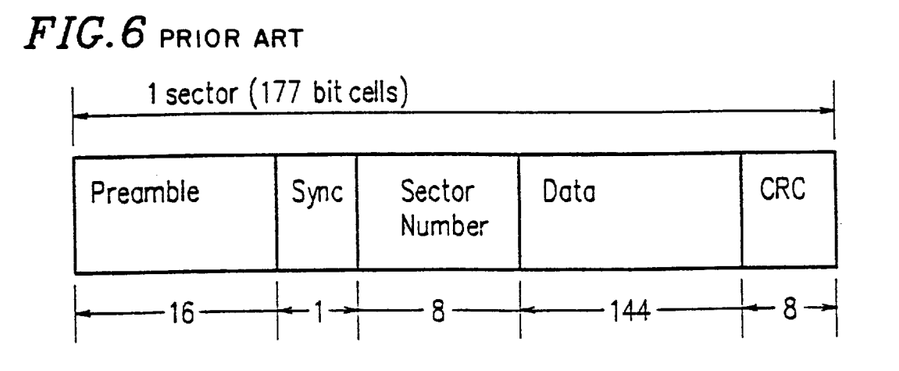
FIG. 6 is a map specifically showing the data format of the respective sector parts of the PEP region.

As shown in FIG. 6, a sector part includes: a preamble section composed of 16 bit cells and used as a sector start buffer; a sync section composed of 1 bit cell and used for the detection of synchronization; a sector number section composed of 8 bit cells and used for the identification of a sector number; a data section composed of 144 bit cells and used for writing data therein; and a CRC section composed of 8 bit cells and used for the error detection.

Figure 7:
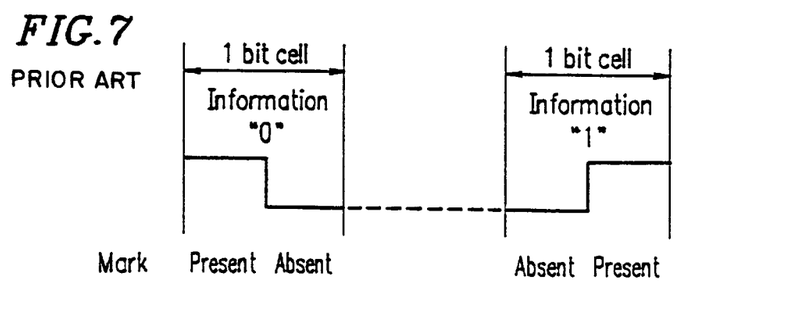
FIG. 7 is a map illustrating the method for discriminating the unit of information representing "0" from the unit of information representing "1" in the PEP region.

The units of information recorded in the PEP region are discriminated one by one, as shown in FIG. 7, thereby various kinds of information are reproduced. More specifically, when the state where a recording mark is present (hereinafter, referred to as a "mark-present state") is turned into a state where a recording mark is absent (hereinafter, referred to as a "mark-absent state") in one bit cell, or when the level of a reproduced signal falls in a period corresponding to one bit cell, the unit of information carried by the reproduced signal is discriminated as "0". On the other hand, when the mark-absent state is turned into the mark-present state in one bit cell, or when the level of a reproduced signal rises, the unit of information carried by the reproduced signal is discriminated as "1".

Figure 8:
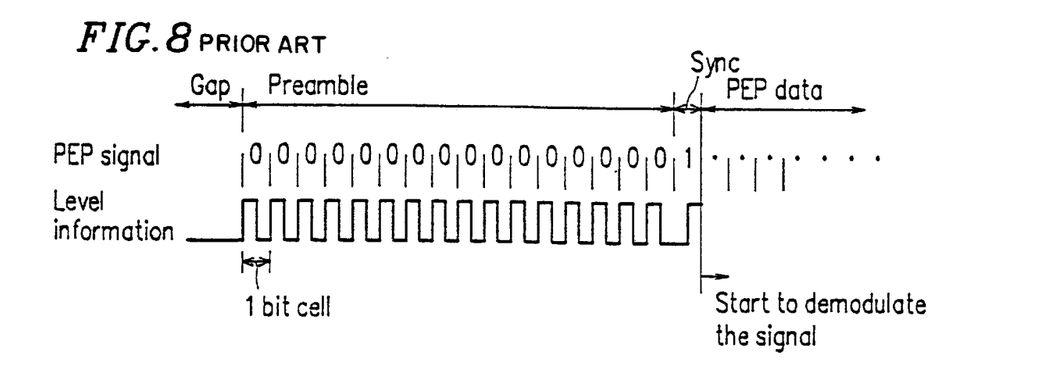
FIG. 8 illustrates the change in the level of the PEP signal reproduced from the preamble section and the data section of each sector part.

For example, in the preamble section following the gap part where no signal is recorded, 16 units of information representing "0" are successively recorded, as shown in FIG. 8. In the sync section following the preamble section, one unit of information representing "1" is recorded.

In the PEP region, it depends upon the presence of the recording mark in one bit cell whether the unit of information corresponding to the one bit cell represents "0" or "1". The units of information are obtained by dividing the signal reproduced from the disk into a plurality of portions each of which corresponds to one bit cell and then interpreting each of the divided portions. Therefore, unless the signal reproduced from the PEP region (hereinafter, simply referred to as a "PEP signal") is correctly divided, the information recorded in the PEP region cannot be correctly reproduced.

In a conventional disk drive, in order to correctly reproduce the information recorded in the PEP region, the PEP signal starts to be read after the rotation speed of the disk increases and is stabilized at a constant value. While the rotation speed of the disk is constant, the time period required for reading the signal corresponding to one bit cell is also constant. Therefore, by starting to divide the PEP signal into a plurality of portions immediately after the unit of information representing "1" in the sync section is detected, the PEP signal can be correctly divided. As a result, various kinds of information recorded in the PEP region can be correctly reproduced.

However, in the case where the reproduction of the PEP signal is not started until the rotation speed of the disk becomes constant, as in a conventional disk drive, the period after the disk starts to rotate until the rotation speed of the disk becomes constant is a waste for reproducing the information recorded in the PEP region. Accordingly, such a period prevents the reproduction speed or the recording speed for the disk from being increased.

Instead, if an attempt is made to reproduce the information recorded in the PEP region during a period after the disk starts to rotate until the rotation speed of the disk becomes constant, then the period corresponding to one bit cell changes in accordance with the increase in the rotation speed of the disk. Therefore, the PEP signal cannot be correctly divided. As a result, it is also impossible to correctly reproduce various kinds of information recorded in the PEP region.

SUMMARY OF THE INVENTION

The disk drive of this invention, which is used for performing at least a reproducing operation for a disk-shaped recording medium including a PEP region in which information relating to the at least a reproducing operation is recorded, includes rotating means for rotating the recording medium; a pickup for reading a signal from the recording medium; means for thresholding a length of a period in which the level of the signal remains unchanged; demodulating means for receiving the thresholding result and for demodulating the signal to reproduce the information recorded on the recording medium based on the thresholding result; detecting means for detecting the rotation speed of the recording medium and for outputting a rotation speed signal indicative of the rotation speed; correcting means for receiving the rotation speed signal and for supplying a discrimination value in accordance with the rotation speed. In the disk drive of this invention, the signal is demodulated based on the thresholding result obtained using the discrimination value, whereby allowing the information to be reproduced correctly while the rotation speed of the recording medium changes.

In one embodiment of the invention, the thresholding means includes: means for shaping the waveform of the signal read by the pickup; and length discrimination means for detecting a length of the period in which the level of the signal remains unchanged, and for outputting a plurality of units of length information as the thresholding result based on the discrimination value. Each of the units of length information indicates either that the detected length is larger or equal to the discrimination value or that the detected length is smaller than the discrimination value. The demodulating means demodulates the signal based on the units of length information.

In another embodiment of the invention, the correcting means stores a table including a plurality of sets of a first value as the rotation speed of the recording medium and a second value as the discrimination value; selects one set based on the rotation speed signal; and supplies the second value of the selected one set to the length discrimination means.

In still another embodiment of the invention, the second value as the discrimination value is obtained by the following equation:

$$L_{SH}=(L_L+L_S)/2$$

where $L_{SH}$ is the second value; $L_L$ is a length of a period in a case where the level of the signal remains unchanged over a period corresponding to two bit cells and; $L_S$ is a length of a period in a case where the level of the signal remains unchanged over a period corresponding to one bit cell. Herein, one bit cell is a length of a region on the recording medium where one unit of information representing 0 or 1 is recorded.

In still another embodiment of the invention, the signal is read from the PEP region after the recording medium starts to be rotated until the rotation speed of the recording medium reaches the predetermined rotation speed.

In still another embodiment of the invention, the signal is read from a different region from the PEP region while the recording medium is rotated at the predetermined speed.

In still another embodiment of the invention, the rotating means is a spindle motor, and the detecting means includes means for knowing revolutions per unit time of the spindle motor and means for outputting the rotation speed signal based on the knowledge of the revolutions per unit time.

In a disk drive of the present invention, the rotation speed of the disk is detected. For example, in a case of using a motor for rotating the disk, revolutions per unit time of the motor is obtained as a parameter indicative of the rotation speed of the disk by an encoder or the like. A correction circuit outputs a value used for discriminating whether the units of information carried by a signal reproduced from the PEP region are "0" or "1". Then, by using the value, a reproduction section discriminates the units of information carried by the PEP signal, thereby reproducing the information recorded in the PEP region. Therefore, even during a period after the disk starts to rotate until the rotation speed of the disk becomes constant, the information recorded in the PEP region of the disk can be correctly reproduced based on the signal reproduced from the PEP region using the appropriate discrimination value in accordance with the rotation speed of the disk. As a result, a period after the disk drive turns on until the reproduction and/or a recording operation starts can be shortened, resulting in improving the reproduction speed and/or the recording speed.

Thus, the invention described herein makes possible the advantage of providing a disk drive for correctly reproducing the information recorded in the PEP region even in the case where the rotation speed of the disk is changed as the time elapses, thereby increasing the reproduction speed or the recording speed for the disk.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
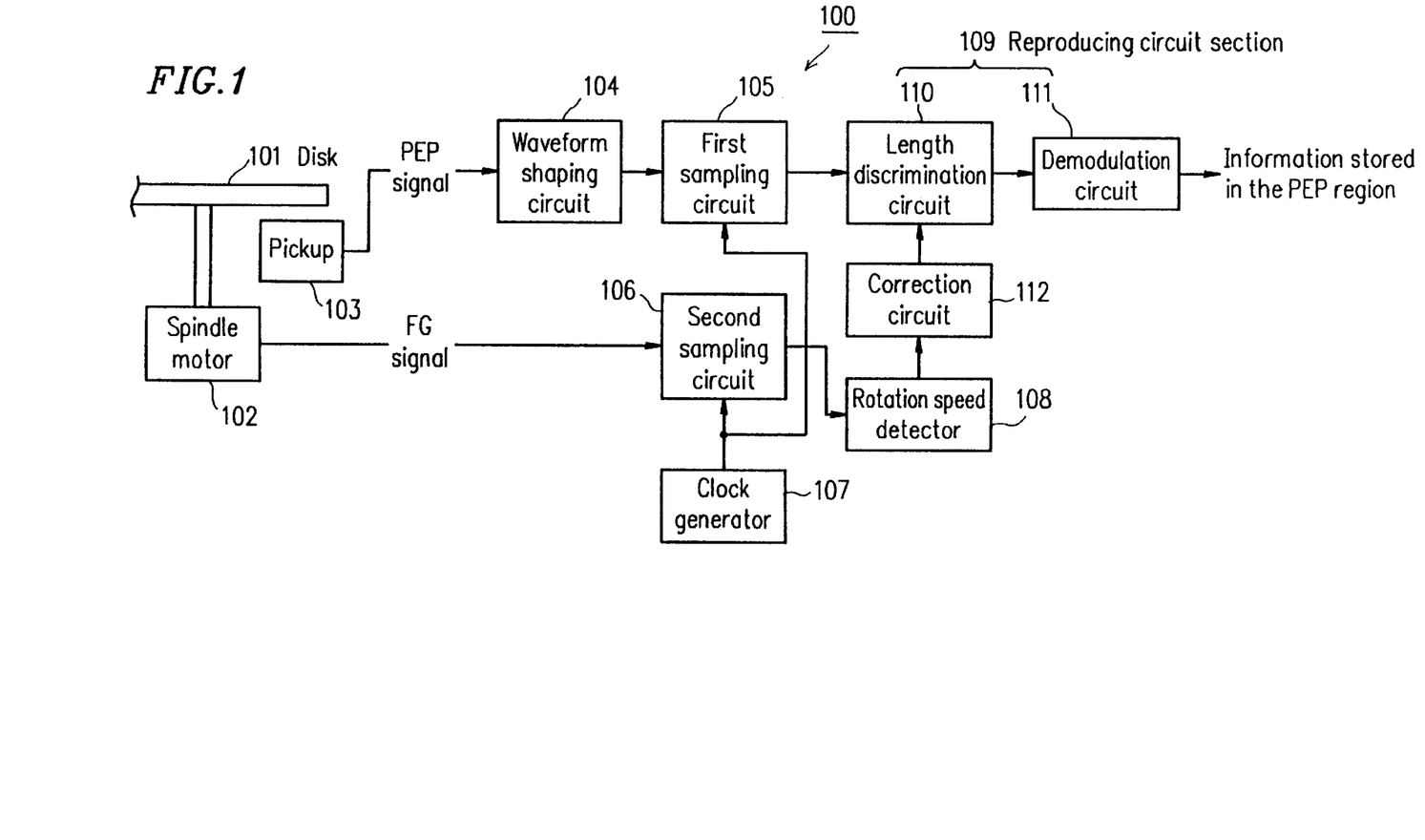
FIG. 1 is a block diagram showing a configuration for an exemplary disk drive according to the present invention.

FIG. 1 is a block diagram showing an exemplary configuration for a disk drive according to the present invention. As shown in FIG. 1, the disk drive 100 of this example includes a spindle motor 102 for rotating a disk 101 and an optical pickup 103 for reading a signal from the disk 101. In the case where the disk 101 is of a write-once type or a rewritable type, the optical pickup 103 is also used for recording a signal on the disk 101.

The signal read by the optical pickup 103, which includes a PEP signal read from the PEP region on the disk 101, is input to a waveform shaping circuit 104. The waveform shaping circuit 104 shapes the waveform of the signal into a square wave, for example. The signal, the waveform of which has been shaped, is input to a first sampling circuit 105 and sampled by a sampling clock having a high frequency. The sampled signal is supplied to a reproducing circuit section 109 for reproducing the information recorded on the disk 101 based on the signal.

A rotation sensor (not shown), for example, an encoder, is connected to the spindle motor 102. The rotation sensor outputs a pulse signal (FG signal) having a frequency proportional to the revolutions per unit time of the motor 102. The FG signal is supplied to a second sampling circuit 106 and then sampled using a sampling clock having a high frequency. The sampling clocks supplied to the first and second sampling circuits 105 and 106 are generated by a clock generator 107.

The second sampling circuit 106 is connected to a rotation speed detector 108. The rotation speed detector 108 detects the rotation speed of the disk 101 based on the sampled FG signal indicating the revolutions per unit time of the spindle motor 102.

The reproducing circuit section 109 includes a length discrimination circuit 110 and a demodulation circuit 111. The length discrimination circuit 110 discriminates whether the length of the period during which the high or low level of the signal output from the first sampling circuit 105 is long or short, and then outputs the discrimination result.

Hereinafter, it will be described how the length discrimination circuit 110 discriminates whether the length of the period during which the high or low level of the reproduced signal (hereinafter, simply referred to as a "high-level period" and a "low-level period", respectively) is long or short with reference to FIG. 2. Herein, the reproduced signal includes a signal reproduced from the PEP region (i.e., the PEP signal) and a signal reproduced from a region other than the PEP region.

Figure 2:
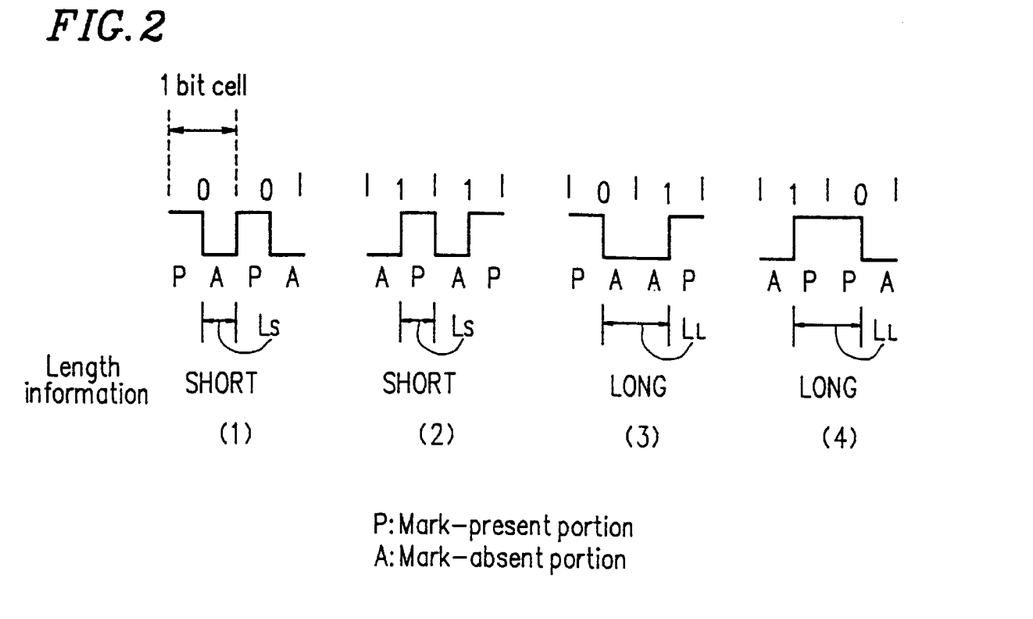
FIG. 2 illustrates the relationship between the change in the level of a PEP signal in accordance with the presence or the absence of a recording mark in the PEP region on the disk, and the unit of length information.

As shown in FIG. 2, as the reproduced signal corresponding to successive two bit cells, there are four kinds of PEP signal which carry different information. More specifically, a region corresponding to two bit cells includes four portions, each of which is either a portion having the mark (hereinafter, referred to as a mark-present portion) or a portion having no mark (hereinafter, referred to as a mark-absent portion). When the mark-present portions and the mark-absent portions are alternately arranged in this order, the information represented by the reproduced signal is "00". When the mark-absent portions and the mark-present portions are alternately arranged in this order, the information represented by the reproduced signal is "11". The reproduced signal represents the "01" where two mark-present portions are arranged to sandwich two mark-absent portions, whereas the reproduced signal represents the "10" where two mark-absent portions are arranged to sandwich two mark-present portions.

In a case where the reproduced signal carries the information "00" or "11", the high-level period or the low-level period of the reproduced signal corresponding to two bit cells has a short length. On the other hand, in the reproduced signal representing "01" or "10", there exists the high-level period or the low-level period of a long length. As is apparent from the above description, the high-level period or the low-level period has two kinds of length, i.e., a long length or a short length.

In this specification, the state of the reproduced signal where the high-level period or the low-level period has a long length will be called a "LONG" state, while the state of the reproduced signal where the high-level period or the low-level period has a short length will be called a "SHORT" state. In addition, the information as to the state of the reproduced signal, i.e., the information indicating whether the reproduced signal is in the LONG state or the SHORT state will be called "length information".

In this case, if the lengths of the LONG state and the SHORT state of the reproduced signal are denoted by $L_L$ and $L_S$, respectively, then $L_L = 2 \times L_S$. When the lengths $L_L$ and $L_S$ are assumed to be constant, a value $L_{SH}$ is obtained by the following equation (1).

$$L_{SH} = (L_L + L_S)/2 \qquad (1)$$

This value $L_{SH}$ (hereinafter, referred to as a discrimination value) is used for discriminating the state of the reproduced signal is in the LONG state or in the SHORT state. In other words, the discrimination value $L_{SH}$ is used for thresholding the length of the high-level period or the low-level period. If the length of the high-level period or the low-level period is equal to or longer than the discrimination value $L_{SH}$, then the reproduced signal can be discriminated to be in the "LONG" state. On the other hand, if the length of the high-level period or the low-level period is shorter than the discrimination value $L_{SH}$, the state of the reproduced signal can be discriminated as the "SHORT" state.

The length discrimination circuit 110 discriminates whether the reproduced signal is in the "LONG" state or in the "SHORT" state, using the discrimination value $L_{SH}$, and then outputs the discrimination result to the demodulation circuit 111.

In the above description of the length discrimination circuit 110, the lengths $L_L$ and $L_S$ of the high-level period or the low-level period are assumed to be constant. However, in the disk drive 100 according to the present invention, a signal is read from the PEP region during the period before the rotation speed of the disk 101 becomes constant. Therefore, in actuality, the lengths $L_L$ and $L_S$ of the high-level period or the low-level period of the PEP signal change in accordance with the change in the rotation speed of the disk 101. In order to compensate the change of the discrimination value $L_{SH}$ due to the changes of the lengths $L_L$ and $L_S$ of the high-level period or the low-level period, the disk drive 100 of the present invention includes a correction circuit 112.

The correction circuit 112 stores a table including various rotation speeds of the disk 101 indicated by the output from the detector 108 and discrimination values $L_{SH}$ at the respective rotation speeds of the disk 101. Each discrimination value $L_{SH}$ is determined using the above-mentioned equation (1) and the lengths $L_L$ and $L_S$ at the corresponding rotation speed of the disk 101. Upon receipt of the output of the rotation speed detector 108, the correction circuit 112 outputs a selected one of the discrimination values $L_{SH}$ stored therein to the length discrimination circuit 110, based on the received output of the rotation speed detector 108.

As described above, the correction circuit 112 outputs an appropriate discrimination value $L_{SH}$ in accordance with the change in the lengths $L_L$ and $L_S$ of the high-level period or the low-level period caused by the change of the rotation speed of the disk 101. The length discrimination circuit 110 discriminates the state of the reproduced signal supplied from the first sampling circuit 105 using the discrimination value $L_{SH}$, and outputs the discrimination result to the demodulation circuit 111. Based on the discrimination result output from the length discrimination circuit 110, the demodulation circuit 111 demodulates the information recorded on the disk 101.

Next, the operation of the disk drive 100 of the present invention for reproducing the information from the PEP region on the disk 101 will be described with reference to the flow chart shown in FIG. 3, the waveforms shown in FIG. 4 and the state transition diagram shown in FIG. 9.

In reproducing information onto the disk 101 or recording information from the disk 101, first, the spindle motor 102 starts to rotate, so that the disk 101 starts to rotate. Then, the signal is read by the optical pickup 103 from the PEP region on the disk 101. The PEP signal read by the optical pickup 103 is shaped into a signal having square wave by the waveform shaping circuit 104 and then sampled by the first sampling circuit 105.

When the spindle motor 102 starts to rotate, a pulse signal having a frequency proportional to the revolutions per unit time of the motor 102, i.e., the FG signal, is output from the rotation sensor attached to the spindle motor 102. The FG signal is supplied to the second sampling circuit 106. The second sampling circuit 106 samples the FG signal and outputs the sampled FG signal to the rotation speed detector 108. Based on the sampled FG signal, the rotation speed detector 108 detects the rotation speed of the disk 101. The detection result is supplied to the correction circuit 112.

The correction circuit 112 supplies an appropriate discrimination value $L_{SH}$ to the length discrimination circuit 110 in accordance with the output of the rotation speed detector 108, as described above. In this way, during a period after the disk 101 starts to rotate until the rotation speed of the disk becomes constant, the length discrimination circuit 110 receives the discrimination value $L_{SH}$ which is appropriate for thresholding the length of the "LONG" state or the "SHORT" state.

Based on the discrimination value $L_{SH}$, the length discrimination circuit 110 discriminates whether or not the PEP signal output from the first sampling circuit 105 includes the high-level period having a long length or the low-level period having a long length. The discrimination result is output to the demodulation circuit 111 as the length information "LONG" or "SHORT".

Since the length information is produced based on the level of the signal, the level of the signal corresponding to each unit of length information is always different from that corresponding to the adjacent unit of length information. As described above, the length information also includes information of the level of the signal. Hereinafter, referring to FIG. 9, the relationship between the transition of the information corresponding to two adjacent bit cells and the length information will be described in more detail.

Figure 9:
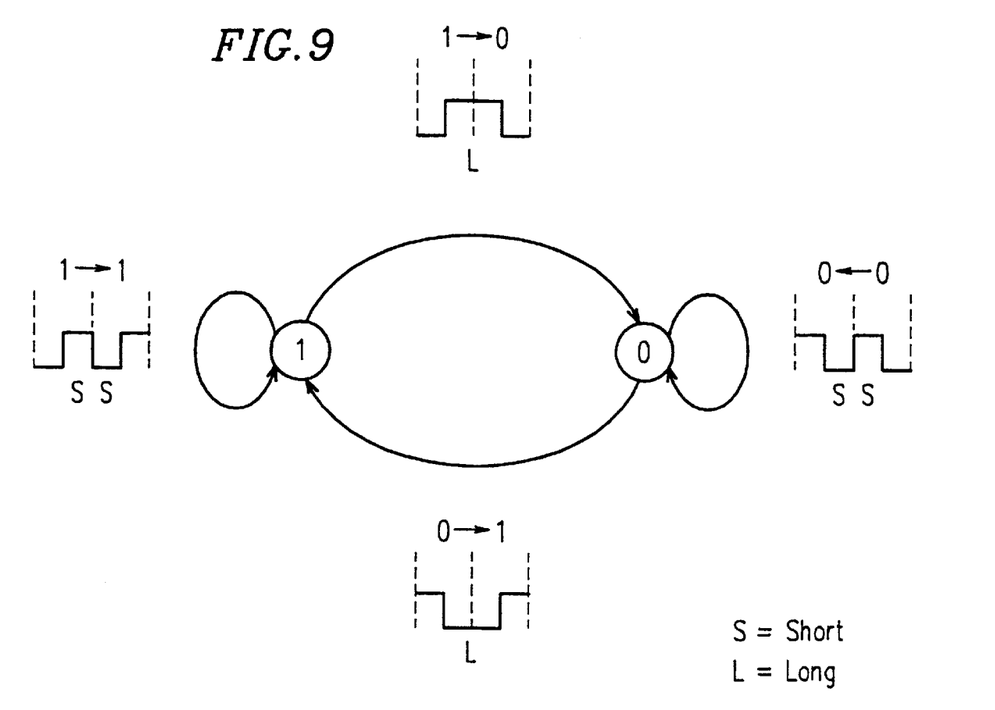
FIG. 9 illustrates the change in the units of length information in accordance with the transition of the information recorded in a region having two bit cells of the PEP region.

As shown in FIG. 9, there are four different kinds of information transitions in four pairs of the two adjacent bit cells. Namely, a transition from the information "1" to the information "1" (hereinafter, simply expressed as "1→1", etc.), a transition "1→0", a transition "0→0" and a transition "0→1". The units of length information corresponding to the respective transitions are shown in FIG. 9. As shown in FIG. 9, in a case of two transitions "1→1"and "0→0", i.e., a case where two adjacent unit of recorded information are of the same type, there exist two units of length information corresponding to the border of the two adjacent units of recorded information, which are "SHORT". On the other hand, in a case of two transitions "1→0" and "0→1", i.e., a case where two adjacent unit of recorded information are of different types, a unit of length information "LONG" only correspond to the border of the two adjacent units of recorded information.

Therefore, in order to distinguish the transition "1→1" from the transition "1→0", it is necessary to identify the type of one or two units of length information corresponding to the border of the two adjacent units of recorded information. In a case where a former one of the two units of length information is "SHORT", it is necessary to know whether or not the next unit of length information is also "SHORT". In the same way, in order to distinguish the transition "0→0" from the transition "0→1", it is necessary to identify the type of one or two units of length information corresponding to the border of the two adjacent units of recorded information. However, when a former one of the two units of length information is "SHORT", it is also necessary to know whether or not the next unit of length information is "SHORT" in order to identify the transition of the recorded information.

The discrimination result thus obtained is supplied from the length discrimination circuit 110 to the demodulation circuit 111. The demodulation circuit 111 demodulates the reproduced signal by identifying the transition of the recorded information based on the units of length information, as described above. The demodulated PEP signal represents various kinds of information recorded in the PEP region. When the demodulation of the PEP signal from the sector number section, the data section, and the CRC section, by the demodulation circuit 111 is finished; the reproduction of all of the information recorded in the PEP region is completed.

Hereinafter, units of length information obtained when the information from the PEP region is reproduced. Immediately after no signal period corresponding to the gap part is terminated, a signal corresponding to 16 bit cells is obtained from the preamble section of the sector part. As described above, as the signal from the preamble section, a signal carrying 16 successive units of information "0" are obtained. Next, a signal corresponding to one bit cell, which carries the information "1", is obtained from the sync section. Therefore, 31 units of "SHORT" length information are successively obtained based on the signal read from the preamble section and one unit of "LONG" length information is then obtained based on the signal read from the sync section, as shown in FIG. 8.

Next, a signal carrying various kinds of information recorded in the PEP region (in particular, in the sector number section, the data section and the CRC section) are obtained. The type of units of length information of the signal, which is read from the sector number section through the CRC section, is either "LONG" or "SHORT" depending upon transitions of the information recorded therein.

Accordingly, in recording or reproducing operation for the disk 101, units of length information of the signal read from the PEP region are first obtained, and then the type of each unit of length information is identified. Immediately after one unit of "LONG" length information following 31 successive units of "SHORT" length information is detected, the demodulation of the signal read from the PEP region starts, so that the various kinds of information recorded in the sector number section through the CRC section is obtained. A portion of the signal corresponding to the one unit of "LONG" length information, has a low level, as shown in FIG. 8.

Hereinafter, the demodulation of the signal starting immediately after the detection of the one unit of "LONG" length information following to the 31 successive units of "SHORT" length information will be described, referring to the flow chart shown in FIG. 3. The signal is demodulated by the demodulation circuit 111.

First, in Step S1, the type of a unit of length information which is output from the length discrimination circuit 110 is identified. In the case where the unit of length information to be identified is supplied immediately after the one "LONG" length information corresponding to the sync section, the signal immediately after the detection of the one "LONG" length information should have a level changing from low to high in a period corresponding to one bit cell, as shown in the waveform [1] of FIG. 4 when the identification result is "SHORT". Therefore, information represented by this signal is identified to be "1" in Step S2. On the other hand, when the identification result is "LONG", this means that the level of the signal immediately after the detection of the one "LONG"length information remains high in the period corresponding to one bit cell, as shown in the waveform [2] of FIG. 4. Therefore, in Step S6, the information represented by this signal is discriminated to be "0".

In Steps S3 and S7 following Steps S2 and S6 respectively, it is judged whether or not the identification of the type of a unit of length information is finished for all units of length information obtained from the PEP region. All units of length information have been already subjected to the type identification, the demodulation is completed. If there is any unit of length information which has not been subjected to the type identification yet, the next unit of length information is discriminated to be "LONG" or "SHORT" in Steps S4 and S8, respectively. In Step S4, if the signals have been normally read and processed in the circuits 104 through 110, the information "SHORT" should be obtained as the next unit of length information. Therefore, if "SHORT" is actually obtained, the identification performed in Step S2 is confirmed. Then, the flow returns to Step S1 again for preparing to the identification of the next unit of length information. To the contrary, when "LONG" is obtained in Step S4, this result indicates that the level of the signal remains low, as shown in the waveform [5] of FIG. 4. In this case, the signal is judged to be read or processed in an abnormal way. Accordingly, the demodulation by the demodulation circuit 111 is finished as an error occurs (Step S5).

Figure 3:
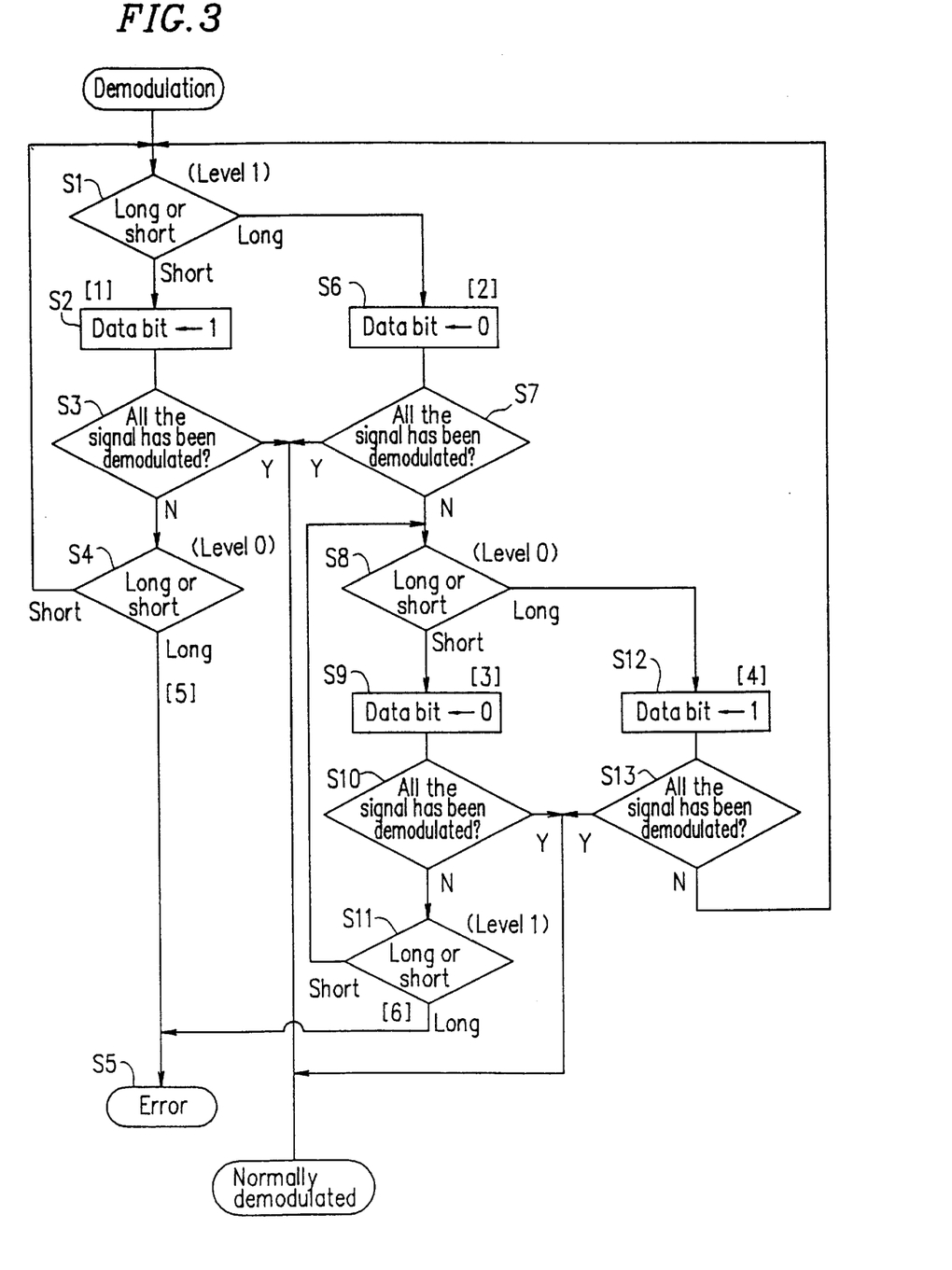
FIG. 3 is a flow chart illustrating the reproducing operation of the information recorded in the PEP region based on the demodulated PEP signal according to the present invention.
Figure 4:
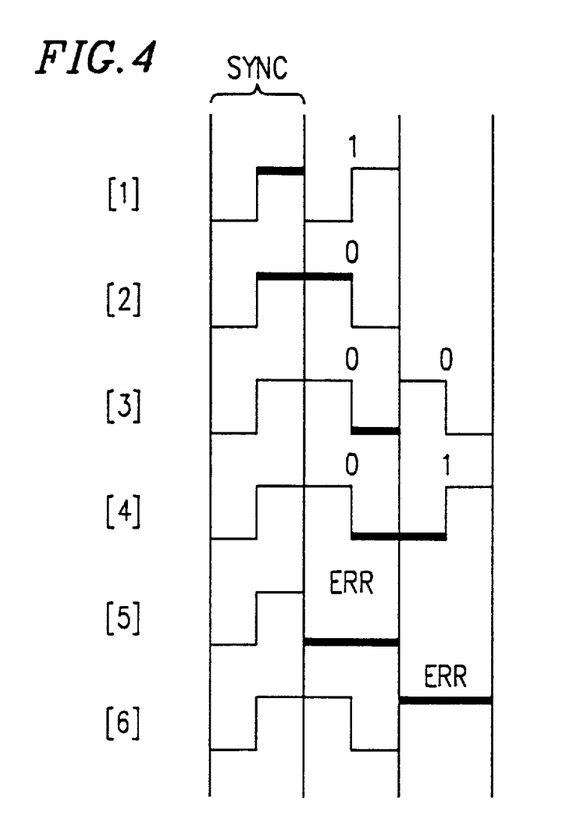
FIG. 4 shows six waveforms of the PEP signal.

If "SHORT" is discriminated in Step S8, then the level of the signal is expected to change as shown in the waveform [3] of FIG. 4. Therefore, in Step S9, the signal corresponding to the next one bit cell is also judged to represent the information "0". Then, if the demodulation of all the signals read from the PEP region has not been finished yet in Step S10, the next unit of length information supplied from the length discrimination circuit 110 is waited. If the signals have been normally read and processed in the circuits 104 through 110, the next unit of length information should be "SHORT" as is apparent from the waveform [3] of FIG. 4. Therefore, if "SHORT" is obtained in Step S11, then the signal is regarded as a normally demodulated one and the next signal is demodulated from Step S8 again. To the contrary, in the case where "LONG" is obtained in Step S11, the level of the signal is in the state shown in the waveform [5] of FIG. 4 and the signal cannot be demodulated. Therefore, such a case is regarded as an error in the step S5.

On the other hand, if "LONG" is obtained as the unit of length information in Step S8, this indicates that the level of the signal remains low in a period corresponding to one bit cell, as shown in the waveform [4] of FIG. 4. Therefore, the information represented by the signal is judged to be "1" in Step S12. Then, if the demodulation of all the signals read from the PEP region have not been finished yet in Step S13, the next signal is demodulated from the step S1 again.

In this way, the demodulation circuit 111 sequentially demodulates the signals read from the PEP region for every bit cell, based on the units of length information output from the length discrimination circuit 110.

The demodulation of information corresponding to adjacent two bit cells having the transition "1→1" shown in FIG. 9 starts from Step S1, flows through Steps S2, S3, and S4 in this order and returns to Step S1 shown in FIG. 3; the demodulation of the information having the transition "1→0" flows through Steps S1→S6→S7→S8 shown in FIG. 3; the demodulation of the information having the transition "0→0" flows through Steps S8→S9→S10→S11→S8 shown in FIG. 3; and the demodulation of the information having the transition "0→1" proceeds through Steps S8 S12 S13→S1 shown in FIG. 3.

According to the present invention, the discrimination value $L_{SH}$ is used for discriminating whether the period during which the level of the reproduced signal remains high or low is the longer one or the shorter one of the two kinds of periods. If such a value is used, then it is only necessary to identify the type of a unit of length information of the reproduced signal, resulting in eliminating the necessity to correctly divide the reproduced signal into a plurality of portions each of which has a duration equal to one bit cell and to judge whether each divided portion carries the information "0" or "1". Therefore, the error rate can be advantageously reduced in the discrimination result of the information. However, even when the rotation speed of the disk 101 is varied, the information can be correctly reproduced, so long as the reproduced signal can be correctly divided, by judging each divided portion of the signal whether it carries the information "0" or "1".

In the above example, the present invention is applied to a disk drive for a magnetooptical disk. However, the present invention is also applicable to a disk drive for an optical disk and the same effects as those described above can be attained.

As is apparent from the foregoing description, the disk drive according to the present invention has the following effects.

(1) During an acceleration period after a disk starts to rotate until the rotation speed of the disk becomes constant, the information recorded in the PEP region of the disk can be correctly reproduced based on the signal read from the PEP region. Therefore, the reproduction speed or the recording speed for the disk can be increased as compared with a conventional disk drive.

(2) Since a discrimination value $L_{SH}$ is used for demodulating the information in the PEP region, in particular, it is only necessary to identify whether each unit of length information represents "LONG" or "SHORT". This eliminates a necessity of dividing the signal into a plurality of portions each of which has a duration equal to one bit cell as in the conventional disk drive. Therefore, the error rate can be advantageously reduced in the discrimination result.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disk drive for performing at least one of a reproducing operation and a recording operation for a disk-shaped recording medium on which information is recorded, the recording medium including a PEP region in which information relating to the at least a reproducing operation and a recording operation is recorded, the disk drive comprising:

rotating means for rotating the recording medium;

a pickup for reading a signal from the recording medium;

means for thresholding a length of a period in which the level of the signal remains unchanged;

demodulating means for receiving the thresholding result and for demodulating the signal to reproduce the information recorded on the recording medium based on the thresholding result;

detecting means for detecting the rotation speed of the recording medium and for outputting a rotation speed and signal indicative of the rotation speed;

correcting means for receiving the rotation speed signal and for supplying a discrimination value used for thresholding the length of the period to the thresholding means, in accordance with the rotation speed;

wherein the signal is demodulated based on the thresholding result obtained using the discrimination value, whereby allowing the information to be reproduced correctly while the rotation speed of the recording medium changes.

2. A disk drive according to claim 1, wherein the thresholding means comprises:

means for shaping the waveform of the signal read by the pickup; and length discrimination means for detecting a length of the period in which the level of the signal remains unchanged, and for outputting a plurality of units of length information as the thresholding result based on the discrimination value, each of the units of length information indicating either that the detected length is larger or equal to the discrimination value or that the detected length is smaller than the discrimination value, wherein the demodulating means demodulates the signal based on the units of length information.

3. A disk drive according to claim 2, wherein the correcting means stores a table including a plurality of sets of a first value as the rotation speed of the recording medium and a second value as the discrimination value; selects one set based on the rotation speed signal; and supplies the second value of the selected one set to the length discrimination means.

4. A disk drive according to claim 3, wherein the second value as the discrimination value is obtained by the following equation:

$$L_{SH}=(L_L+L_S)/2$$

where $L_{SH}$ is the second value; $L_L$ is a length of a period in a case where the level of the signal remains unchanged over a period corresponding to two bit cells; and $L_S$ is a length of a period in a case where the level of the signal remains unchanged over a period corresponding to one bit cell, one bit cell being a length of a region on the recording medium where one unit of the information representing 0 or 1 is recorded.

5. A disk drive according to claim 3, wherein the signal is read from the PEP region after the recording medium starts to be rotated until the rotation speed of the recording medium reaches the predetermined rotation speed.

6. A disk drive according to claim 5, wherein the signal is read from a different region from the PEP region while the recording medium is rotated at the predetermined speed.

7. A disk drive according to claim 1, wherein the rotating means is a spindle motor, and the detecting means includes means for determining revolutions per unit time of the spindle motor and means for outputting the rotation speed signal based on the revolutions per unit time.

* * * * *